United States Patent Office 2,946,767
Patented July 26, 1960

2,946,767

MANUFACTURE OF REACTION PRODUCTS OF POLYISOCYANATES WITH ETHYLENE OXIDE ADDITION PRODUCTS

Hans Gassmann, Basel, Switzerland, assignor to Ciba Limited, Basel, Switzerland, a Swiss firm No Drawing. Filed Aug. 9, 1956, Ser. No. 603,164

Claims priority, application Switzerland Aug. 12, 1955

10 Claims. (Cl. 260—47)

It is known to react polyfunctional isocyanates with addition products of alkylene oxides with dialcohols or polyalcohols. In this manner there are obtained products of high molecular weight which are resin-like products or dense artificial plastics, depending on the nature and relative proportions of the compounds used for the reaction.

The present invention is based on the unexpected observation that products of high molecular weight can also be obtained by reacting a polyisocyanate with an addition product of an alkylene oxide with a compound containing only one hydrogen atom capable of reacting with an alkylene oxide.

Accordingly, the present invention provides a process for the manufacture of reaction products of high molecular weight of polyisocyanates with an alkylene oxide addition product, wherein a polyisocyanate, especially a diisocyanate, is reacted with an addition product having a molecular weight of at least 1000 of an alkylene oxide, especially ethylene oxide, with a compound which contains at least 8 carbon atoms and contains only one hydrogen atom capable of reacting with an alkylene oxide.

As polyisocyanates there may be used aliphatic or aromatic polyisocyanates, for example, hexamethylene diisocyanate, toluene diisocyanate, naphthylene-1:5-diisocyanate, 4:4'-diphenylmethane diisocyanate, 4:4'-diphenyldiisocyanate, 1:4-phenylene diisocyanate and triphenylmethane triisocyanate.

As compounds containing at least 8 carbon atoms and only a single hydrogen atom capable of reacting with an alkylene oxide there may be used monoalcohols, such as dodecyl, cetyl, octadecyl, octadecenyl or hydroabietyl alcohol; higher monocarboxylic acids, such as myristic acid, palmitic acid, stearic acid or oleic acid; alkyl-monophenols such as octyl-phenol, nonyl-phenol or dodecylphenol; higher secondary monoamines such as didodecylamine, or dioctadecylamine; alkyl-benzimidazoles; or higher monomercaptans such as dodecylmercaptan. There may also be used mixtures of 2 or more of these compounds. As alkylene oxides there may be used ethylene oxide, propylene oxide or higher alkylene oxides.

The reaction products obtained dissolve in water or organic solvents to give more or less highly viscous solutions, depending on the nature and relative proportions of the starting materials used for making them. The products are surface-active and are valuable assistants for the production or stabilization of a wide variety of dispersed systems, such as emulsions or suspensions. The reaction products that are easily soluble in water are especially suitable for use in emulsions of the oil-in-water type, since, owing to their macromolecular structure, they can in many cases replace emulsifying agents, such as methylcellulose or polyvinyl alcohol. They impart to emulsions, which may contain, for example, highly dispersed elastomers and/or artificial resins and/or hydrocarbons as the inner phase, excellent lubricating properties and a high stability, so that they are especially suitable for use in printing compositions for pigment printing. For pigment printing the products of the invention possess the valuable property of influencing the viscosity of emulsions of the oil-in-water type prepared therwith, even when there is a relatively large change in the ratio of the phases to a smaller extent than in the case of emulsions which merely contain the ordinary ion-free or ion-active emulsifying agents hitherto used, and which, for example, undergo a considerable reduction in viscosity when a few parts percent of water are added.

Addition products of alkylene oxides with compounds containing fewer than 8 carbon atoms, or addition products having a molecular weight substantially less than 1000, possess a lower emulsifying power and consequently a lower stabilizing capacity than the products of the invention, and also they are insufficiently soluble in water, especially at raised temperatures.

The products of the invention are prepared in a simple manner by reacting the alkylene oxide reaction product with the polyisocyanate while kneading or stirring the reaction may be carried out at a raised temperature, in which case reaction components which are solid at normal temperature, are advantageously used in the molten state or dissolved in an inert solvent. Since the ethylene oxide addition products are usually prepared with the use of an alkali as catalyst, it is necessary, prior to reaction with the isocyanate, to neutralize any alkali present with a substance of acid reaction, for example, an acid chloride, an acid or acid anhydride. In this manner the reaction which may in some cases be strongly exothermic is moderated.

The polyglycol ethers of monocarboxylic acids may be made by esterifying the acid with a polymerized ethylene oxide product, instead of by additive combination with ethylene oxide.

The proportion of the polyisocyanate used in the reaction is at least 1, and advantageously more than 1.5, isocyanate equivalents per mol of alkylene oxide addition product, and generally depends on the length of the polyglycol ether chain. Generally speaking, the proportion of isocyanate is greater the higher the molecular weight of the alkylene oxide addition product. The use of too low a proportion of polyisocyanate leads to reaction products of inadequate viscosity, and the use of too high a proportion of isocyanate leads to products which are no longer water-soluble, and are therefore not suitable for use in aqueous emulsions.

The following examples illustrate the invention, the parts and percentages being by weight:

*Example 1*

41 parts of the addition product of 25 mols of ethylene oxide with 1 mol of octadecyl alcohol are fused and neutralized by the addition of 0.5 part of glacial acetic acid. At about 70° C., 2.6 parts (1.0 equivalent) of toluylene-2:4-diisocyanate are added, and the whole is stirred as rapidly as possible to form a homogeneous mixture. The reaction is brought to an end by heating the mixture for about 15 minutes at 100° C., and there is then obtained a viscous honey-like mass which forms a viscous resin at room temperature.

An aqueous solution of 50 percent strength of the above product is a stiff gel, and a solution of 20 percent strength is liquid and has a viscosity of about 50,000 centipoises at 40° C. The reaction product has a relatively short polyethylene glycol chain, and is therefore transiently insoluble in water at a raised temperature. A neutral aqueous solution of 1 percent strength has, for example, a turbidity point of 47° C.

*Example 2*

200 parts of the addition product of 120 mols of ethylene oxide and 1 mol of a commercial mixture consisting for the greater part of oleyl alcohol are fused, neutralized by the addition of 0.3 part of glacial acetic acid and the mixture is finally rapidly stirred at 65° C. with 10 parts (2.11 equivalents) of diphenylmethane-4:4'-diisocyanate. In less than 1 minute a considerable increase in viscosity is observed, coupled with a rise in temperature of about 15–20° C. The reaction is completed by stirring the mixture for about ½ hour longer at 100° C.

When cooled the reaction product is a tough wax-like mass which is not very brittle and easily dissolves in water. An aqueous solution of 25 percent of this product has a viscosity of 2500 centipoises, whereas a corresponding solution of the starting material not reacted with diisocyanate has a viscosity of only 150 centipoises.

Aqueous solutions of the reaction product have an excellent emulsifying capacity, and yield stable emulsions of the oil-in-water type with a very wide variety of media. Emulsions having a relatively low content of the product in the internal oily phase are highly viscous. Thus, the reaction product has marked thickening action on oil-in-water emulsions.

A finely dispersed emulsion which has been homogenized under pressure and contains as emulsifier 2 percent of the addition product of 1 mol of oleyl alcohol and 120 mols of ethylene oxide used as starting material in this example, 43 percent of water and 55 percent of petroleum hydrocarbons has a viscosity of only 42 centipoises at 20° C., and is therefore very fluid.

On the other hand, an emulsion prepared in the same manner with the same proportions of ingredients, but which contains as emulsifier the diisocyanate reaction product of this example, is very viscous and has a viscosity of 420 centipoises at 20° C.

The excellent lubricating action of the emulsion renders it very suitable, for example, as a vehicle for pigment printing on textiles either in roller printing or in screen printing.

Example 3

100 parts of the addition product of 100 mols of ethylene oxide with 1 mol of commercial hydroabietyl alcohol are fused and neutralized by the addition of 0.15 part of glacial acetic acid. The mixture is stirred as rapidly as possible at 65° C. with 6 parts of diphenylmethane-4:4'-diisocyanate. In a short time a homogeneous highly viscous mass is obtained, which on cooling solidifies to a wax-like mass which is easily soluble in water and yields relatively highly viscous solutions.

By varying the proportion of isocyanate it is possible to vary the viscosity of aqueous solutions of the product as desired, as will be seen from the following table:

| Parts of diphenylmethane-4:4'-diisocyanate per 100 parts of ethylene oxide addition product | Viscosity in centipoises of an aqueous solution of 25 percent strength of the product at 20° C. |
|---|---|
| 0 parts | 62 |
| 1.34 parts (0.5 equivalent) | 550 |
| 2.68 parts (1 equivalent) | 3,300 |
| 4.02 parts (1.5 equivalents) | 10,000 |
| 5.38 parts (2 equivalents) | 20,000 |
| 6.03 parts (2.25 equivalents) | 30,000 |

The reaction products yielding highly viscous solutions are especially valuable as assistants for preparing emulsion thickenings for textile printing.

Example 4

49 parts of the addition product of 50 mols of ethylene oxide and 1 mol of para-n-nonyl-phenol are fused and neutralized by the addition of 0.2 part of glacial acetic acid. A solution of 2.1 parts (1 equivalent) of naphthylene-1:5-diisocyanate in 2.1 parts of ortho-dichlorobenzene is added while stirring well. The viscosity increases rapidly. The reaction is completed by stirring the mixture for a further 2½ hours at 100° C., and there is finally obtained a viscous mass which is easily soluble in water.

An aqueous solution of 20 percent strength of the above reaction product has a viscosity of 23,000 centipoises at 20° C. By using twice the quantity of isocyanate, a solution of 20 percent strength of the final product has a viscosity of 33,000 centipoises, whereas a corresponding solution of the addition product, which has not been reacted with isocyanate, has a viscosity of only 1160 centipoises.

Example 5

100 parts of the addition product of 150 mols of ethylene oxide and 1 mol of μ-heptadecyl-benzimidazole are mixed in the fused state with 0.3 part of glacial acetic acid. At a temperature of 70° C. there are then added 7.5 parts (6.0 equivalents) of toluylene-2:4-diisocyanate, and the whole is immediately stirred to form a homogeneous mixture. The viscosity of the mixture increases very rapidly. The reaction is finished by further stirring, for example, for ½ hour at 100° C. A solution of 50 percent strength of the resulting product in water has a viscosity of 23,000 centipoises at 20° C.

Example 6

100 parts of the addition product of 150 mols of ethylene oxide and 1 mol of stearic acid are fused and neutralized by the addition of 0.3 part of glacial acetic acid. At a temperature of 70° C. there are then added 7.6 parts (6 equivalents) of toluylene-2:4-diisocyanate, and the mass, which rapidly becomes viscous, is immediately stirred to form as homogeneous a mass as possible. There is obtained a viscous product which solidifies on cooling to a wax-like mass and dissolves easily in water. A solution of 50 percent strength of this product has a viscosity of 33,000 centipoises at 20° C.

By using in this example, 8 equivalents of the diisocyanate, instead of 6 equivalents thereof, there is obtained a highly viscous filament-forming mass which can still be dissolved in water, for example, by means of a kneading apparatus. A solution of 10 percent strength of this product has, for example, at room temperature a viscosity of 4800 centipoises.

By using in this example, 10 equivalents of the diisocyanate there is obtained a rubber-like tough mass, which is no longer soluble in water and is only capable of swelling therein.

Example 7

100 parts of a product which at room temperature is liquid, readily water-soluble, and has a brownish color, and which is obtained by the additive combination of a vapor mixture consisting of 40 mols of ethylene oxide and 10 mols of propylene oxide with 1 mol of commercial oleyl alcohol at atmospheric pressure at a temperature of 170° C., are stirred at a temperature of 20° C. with 4.82 parts (1.5 equivalents) of hexamethylene-1:6-diisocyanate. In the course of 1 minute, the temperature of the mixture rises to 40° C. and a considerable increase in viscosity is observed. The reaction is allowed to complete while the mixture is heated at about 80° C. for 20 minutes. The very viscous product is dissolved in water.

At 20° C. an aqueous solution of this product shows a viscosity of 60,000 centipoises, whereas at the same concentration a solution of the original alkylene oxide addition product has a viscosity of but 650 centipoises.

Example 8

100 parts of the brownish, brittle, easily water-soluble wax obtained by the additive combination of 150 mols of ethylene oxide with 1 mol of commercial lauryl mercaptan are fused. To the thinly liquid melt are added at 70° C., 0.07 part by volume of glacial acetic acid and, while the whole is being stirred well, 3.85 parts (3 equivalents) of pure toluylene-2,4-diisocyanate. Immediately, a considerable increase in viscosity and a rise in temperature of about 15° C. can be observed. The reaction is carried to completion at 120° C. in the course of 10 minutes, and the very viscous product is immediately dissolved in 310 parts of warm water. The slightly turbid aqueous solution of 25 percent strength is very viscous; at 20° C. its viscosity is 35,000 centipoises. A 25 percent aqueous solution of the ethylene oxide addition product used as starting material, on the other hand, has a viscosity of but 34 centipoises at 20° C.

What I claim is:

1. A process for the manufacture of a high molecular surface-active polyurethane from an organic polyisocyanate and an alkylene oxide addition product as the sole reactants, wherein an organic polyisocyanate containing only isocyanate groups as reactive functional groups is reacted with a polyglycol ether containing an aliphatic hydrocarbon radical of at least 8 carbon atoms and only one free hydroxyl group and having a molecular weight of at least 1000, and which polyglycol ether derivative is obtained by reacting an alkylene oxide having at most 3 carbon atoms with a member of the class consisting of monoalcohols containing an aliphatic hydrocarbon radical of at least 8 carbon atoms, alkylated monophenols containing an aliphatic hydrocarbon radical of at least 8 carbon atoms, monomercaptans containing an aliphatic hydrocarbon radical of at least 8 carbon atoms, monocarboxylic acids containing an aliphatic hydrocarbon radical of at least 8 carbon atoms and secondary monoamines containing an aliphatic hydrocarbon radical of at least 8 carbon atoms, said polyisocyanate containing at least 1 isocyanate equivalent per mol of alkylene oxide addition product.

2. A process for the manufacture of a high molecular surface-active polyurethane from an organic diisocyanate and an alkylene oxide addition product as the sole reactants, wherein an organic diisocyanate containing only isocyanate groups as reactive functional groups is reacted with a polyglycol ether containing an aliphatic hydrocarbon radical of at least 8 carbon atoms and only one free hydroxyl group and having a molecular weight of at least 1000, and which polyglycol ether derivative is obtained by reacting an alkylene oxide having at most 3 carbon atoms with a member of the class consisting of monoalcohols containing an aliphatic hydrocarbon radical of at least 8 carbon atoms, alkylated monophenols containing an aliphatic hydrocarbon radical of at least 8 carbon atoms, monomercaptans containing an aliphatic hydrocarbon radical of at least 8 carbon atoms, monocarboxylic acids containing an aliphatic hydrocarbon radical of at least 8 carbon atoms and secondary monoamines containing an aliphatic hydrocarbon radical of at least 8 carbon atoms, said diisocyanate containing at least 1 isocyanate equivalent per mol of alkylene oxide addition product.

3. A high molecular and surface-active polyurethane which has been obtained by reacting as the sole reactants an organic polyisocyanate containing only isocyanate groups as reactive functional groups and a polyglycol ether derivative containing a hydrocarbon radical of at least 8 carbon atoms and only one free hydroxyl group and having a molecular weight of at least 1000, and which polyglycol ether derivative is obtained by reacting an alkylene oxide having at most 3 carbon atoms with a member of the class consisting of monoalcohols containing an aliphatic hydrocarbon radical of at least 8 carbon atoms, alkylated monophenols containing an aliphatic hydrocarbon radical of at least 8 carbon atoms, monomercaptans containing an aliphatic hydrocarbon radical of at least 8 carbon atoms, monocarboxylic acids containing an aliphatic hydrocarbon radical of at least 8 carbon atoms and secondary monoamines containing an aliphatic hydrocarbon radical of at least 8 carbon atoms, said polyisocyanate containing at least 1 isocyanate equivalent per mole of polyglycol ether derivative.

4. A high molecular and surface-active polyurethane which has been obtained by reacting as the sole reactants an organic diisocyanate containing only isocyanate groups as reactive functional groups and a polyglycol ether derivative containing a hydrocarbon radical of at least 8 carbon atoms and only one free hydroxyl group and having a molecular weight of at least 1000, and which polyglycol ether derivative is obtained by reacting an alkylene oxide having at most 3 carbon atoms with a member of the class consisting of monoalcohols containing an aliphatic hydrocarbon radical of at least 8 carbon atoms, alkylated monophenols containing an aliphatic hydrocarbon radical of at least 8 carbon atoms, monomercaptans containing an aliphatic hydrocarbon radical of at least 8 carbon atoms, monocarboxylic acids containing an aliphatic hydrocarbon radical of at least 8 carbon atoms and secondary monoamines containing an aliphatic hydrocarbon radical of at least 8 carbon atoms, said diisocyanate containing at least 1 isocyanate equivalent per mole of polyglycol ether derivative.

5. A high molecular and surface-active polyurethane which has been obtained by reacting as the sole reactants an organic diisocyanate containing only isocyanate groups as reactive functional groups and a polyglycol ether derivative containing a hydrocarbon radical of at least 8 carbon atoms and only one free hydroxyl group and having a molecular weight of at least 1000, and which polyglycol ether derivative is obtained by reacting ethylene oxide with a member of the class consisting of monoalcohols containing an aliphatic hydrocarbon radical of at least 8 carbon atoms, alkylated monophenols containing an aliphatic hydrocarbon radical of at least 8 carbon atoms, monomercaptans containing an aliphatic hydrocarbon radical of at least 8 carbon atoms, monocarboxylic acids containing an aliphatic hydrocarbon radical of at least 8 carbon atoms and secondary monoamines containing an aliphatic hydrocarbon radical of at least 8 carbon atoms, said diisocyanate containing at least 1 isocyanate equivalent per mole of polyglycol ether derivative.

6. A process for the manufacture of a high molecular surface-active polyurethane from a diisocyanate and an alyklene oxide addition product as the sole reactants, wherein an organic polyisocyanate containing only isocyanate groups as reactive functional groups is reacted with a polyglycol ether derivative having a molecular weight of at least 1000 and containing an aliphatic hydrocarbon radical of at least 8 carbon atoms and only one free hydroxyl group, and which polyglycol ether derivative is obtained by reacting ethylene oxide with a monoalcohol containing an aliphatic hydrocarbon radical of at least 8 carbon atoms, said polyisocyanate containing at least 1 isocyanate equivalent per mol of alkylene oxide addition product.

7. A process for the manufacture of a high molecular surface-active polyurethane from a diisocyanate and an alklene oxide addition product as the sole reactants, wherein an organic polyisocyanate containing only isocyanate groups as reactive functional groups is reacted with a polyglycol ether derivative having a molecular weight of at least 1000 and containing an aliphatic hydrocarbon radical of at least 8 carbon atoms and only one free hydroxyl group, and which polyglycol ether derivative is obtained by reacting ethylene oxide with an alkylated monophenol containing an aliphatic hydrocarbon radical of at least 8 carbon atoms, said polyisocyanate containing at least 1 isocyanate equivalent per mol of alkylene oxide addition product.

8. A process for the manufacture of a high molecular surface-active polyurethane from a diisocyanate and an alkylene oxide addition product as the sole reactants, wherein an organic polyisocyanate containing only isocyanate groups as reactive functional groups is reacted with a polyglycol ether derivative having a molecular weight of at least 1000 and containing an aliphatic hydrocarbon radical of at least 8 carbon atoms and only one free hydroxyl group, and which polyglycol ether derivative is obtained by reacting ethylene oxide with a mercaptan containing an aliphatic hydrocarbon radical of at least 8 carbon atoms, said polyisocyanate containing at least 1 isocyanate equivalent per mol of alkylene oxide addition product.

9. A process for the manufacture of a high molecular surface-active polyurethane from a diisocyanate and an alkylene oxide addition product as the sole reactants, wherein an organic polyisocyanate containing only isocyanate groups as reactive functional groups is reacted with a polyglycol ether derivative having a molecular weight of at least 1000 and containing an aliphatic hydrocarbon radical of at least 8 carbon atoms and only on free hydroxyl group, and which polglycol ether derivative is obtained by reacting ethylene oxide with a monocarboxylic acid containing an aliphatic hydrocarbon radical of at least 8 carbon atoms, said polyisocyanate containing at least 1 isocyanate equivalent per mol of alkylene oxide addition product.

10. A process for the manufacture of a high molecular surface-active polyurethane from a diisocyanate and an alkylene oxide addition product as the sole reactants, wherein an organic polyisocyanate containing only isocyanate groups as reactive functional groups is reacted with a polyglycol ether derivative having a molecular weight of at least 1000 and containing an aliphatic hydrocarbon radical of at least 8 carbon atoms and only one free hydroxyl group, and which polyglycol ether derivative is obtained by reacting ethylene oxide with a secondary monoamine containing an aliphatic hydrocarbon radical of at least 8 carbon atoms, said polyisocyanate containing at least 1 isocyanate equivalent per mol of alkylene oxide addition product.

References Cited in the file of this patent

UNITED STATES PATENTS

| | | |
|---|---|---|
| 2,233,382 | De Groote et al. | Feb. 25, 1941 |
| 2,772,245 | Simon et al. | Nov. 27, 1956 |

FOREIGN PATENTS

| | | |
|---|---|---|
| 870,471 | France | Dec. 12, 1941 |
| 164,975 | Australia | June 4, 1953 |
| 167,675 | Australia | May 14, 1956 |
| 1,108,785 | France | Sept. 14, 1955 |